R. C. GORHAM.
FLOAT VALVE.
APPLICATION FILED DEC. 7, 1918.
1,355,141.
Patented Oct. 12, 1920.
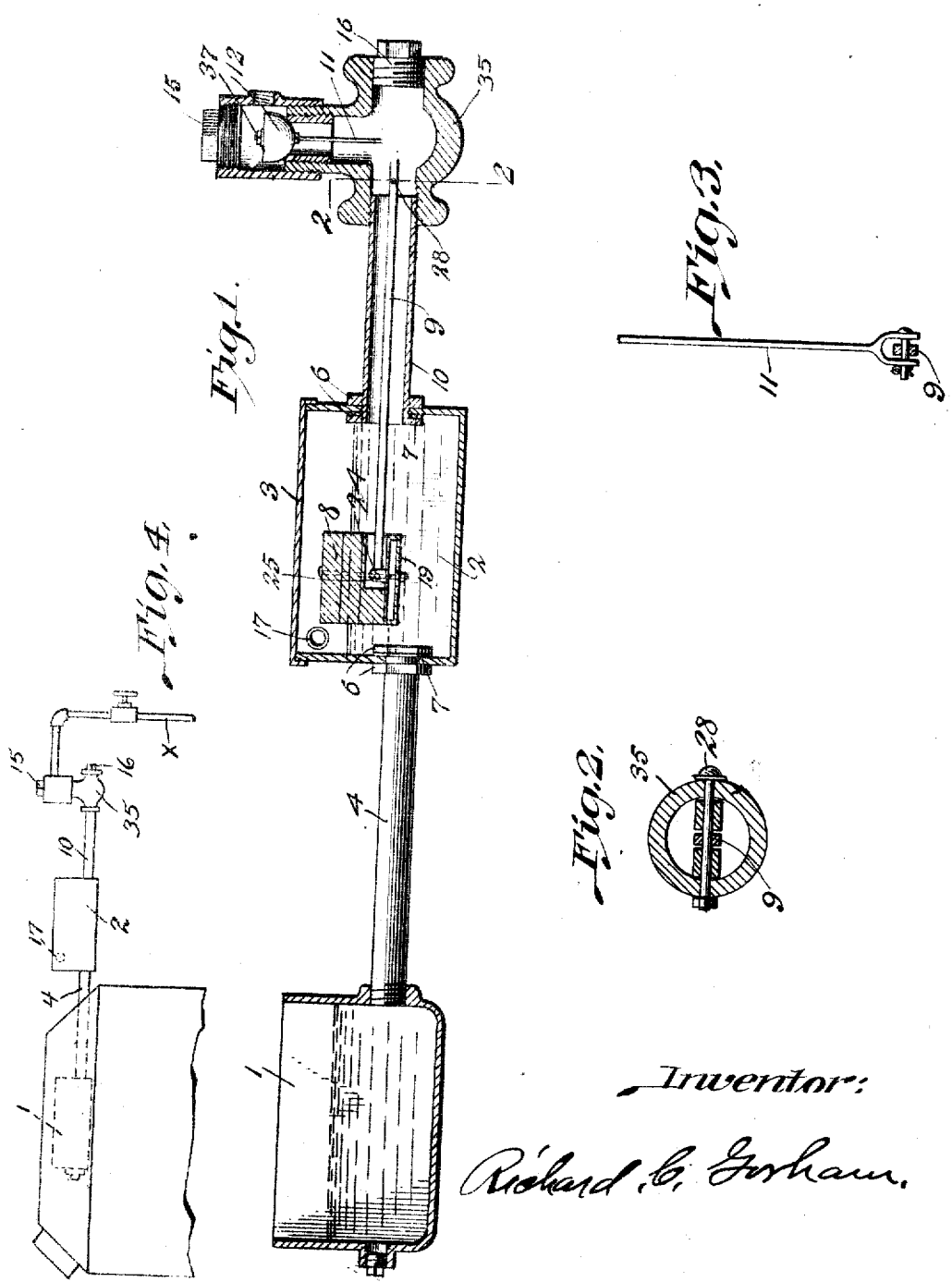

UNITED STATES PATENT OFFICE.

RICHARD C. GORHAM, OF KIRKLIN, INDIANA.

FLOAT-VALVE.

1,355,141.

Specification of Letters Patent.

Patented Oct. 12, 1920.

Application filed December 7, 1918. Serial No. 265,775.

*To all whom it may concern:*

Be it known that I, RICHARD C. GORHAM, a citizen of the United States, residing at Kirklin, in the county of Clinton and State of Indiana, have invented new and Improved Float-Valves, of which the following is a specification.

My invention relates to humidifiers for furnaces in which a pan for holding water is arranged within the furnace casing and is supplied with water from an exterior pan by means of a float in the exterior pan controlling an inlet valve. The invention consists in the features and combination and arrangement of parts hereinafter described and particularly pointed out in the claims.

In the accompanying drawings—

Figure 1 is a sectional view of the apparatus.

Fig. 2 is a sectional view on line 2—2 of Fig. 1.

Fig. 3 is a detail view of the valve stem.

Fig. 4 is a view of the top portion of the furnace with my improvement attached, this being in the nature of a diagram.

In these drawings 1 indicates a pan mounted on a pipe 4 which extends through the casing of the furnace, the said pan being located within this casing. The pipe 4 delivers water to the pan 1 from an outside pan 2. This contains a float made up of upper layers of wood 8 and a lower hollow metal section 19. These parts are secured together by bolts and more or less of the upper wooden sections may be employed to get a sensitive and proper action of the float. A lever 9 is pivotally connected at 25 to the hollow metal float, the said lever being pivoted at 28 within a valve fitting 35. The lever 9 connects with the vertical extending valve stem 11 of the valve 12, which controls the flow of water to the chamber 2 through the fitting and the pipe 10 which pipe connects the fitting with the said chamber. The valve 12 closes vertically and downwardly upon its seat in the direction of the pressure of the water and the float must open the valve against this water pressure. The valve is of the semi-spherical variety and it opens and closes in the direction of the axis of the valve seat. The float as stated is made up of wooden sections superimposed upon the lower hollow metal section and the lower wooden section is recessed in order to provide space for the pivoted connection at 25 between the lever and the float.

When the water in the pan 1 and chamber 2 falls to a certain low level, the corresponding fall of the float will operate the lever 9 and push up on the vertical valve stem 11 and upon the valve against the pressure of water above it, and the water will therefore be supplied to the chamber 2 and the inner pan 1 until the proper level of water is attained when the valve 12 will be closed due to the pressure of water above it and due to the rising of the float in the pan 2. The valve being under pressure of the water tending to close it and being under the control of the float, the cutting off of the water will be insured when the predetermined high level of the water is reached in the pan 2.

The capacity of the float for opening and closing the valve may be determined to a nicety by placing additional wooden sections on or removing sections from the float. The object of the float construction is to provide a float member which will be buoyant when the water is in the tank 2, but will be weighty when the water lowers in the tank. Weight is necessary when the water lowers because the inlet valve in my arrangement must be lifted positively against the pressure of the water. As soon as the water rises in the tank, the float should become buoyant in order to permit the valve to close under the water pressure with practically no resistance. The combined hollow metal float and wooden layers meet both of these objects. The hollow metal float also tends to hold the wood normally above the water so that the wood will not become water logged.

A hollow metal float alone will not contribute to a steady and reliable action of the float, for considerable vibration will ensue from the use of a hollow metal float alone, but when this is combined with the wooden sections undue vibration of the float and valve is avoided.

15 indicates a plug which can be removed for adjusting or replacing the rubber valve 12. 16 is a plug permitting access to the valve connections. 17 is an overflow. This is at a level below the top edge of the inside pan 1 so that in case the valve failed to function, the furnace will not be flooded. As shown in Fig. 4 the apparatus may be connected with a pipe $x$ leading from any suitable source of supply such as a water main.

I claim as my invention:

1. In combination with a valve opening against the pressure of a fluid, a float adapted to actuate said valve comprising a hollow metal body and a superposed wooden body.

2. As an article of manufacture, a float of the type described comprising a hollow metal body and a superposed wooden body, said wooden body being made up of a number of removable layers.

3. The device of claim 2 in which one of said wooden layers is provided with a cut away portion.

RICHARD C. GORHAM.